United States Patent [19]

Hopkins

[11] 3,717,506

[45] Feb. 20, 1973

[54] HIGH VOLTAGE DEPOSITED FUEL CELL

[75] Inventor: Ralph E. Hopkins, Fairfax, Va.

[73] Assignee: The United States of America as represented by the Secretary of the Army

[22] Filed: Jan. 28, 1971

[21] Appl. No.: 110,499

[52] U.S. Cl. ................................136/86 F, 136/86 R
[51] Int. Cl. ..............................................H01m 27/16
[58] Field of Search.........................................136/86

[56] References Cited

UNITED STATES PATENTS

| | | | |
|---|---|---|---|
| 3,492,165 | 1/1970 | Guillot et al. | 136/86 R |
| 3,297,484 | 1/1967 | Niediach | 136/86 D |
| 3,511,714 | 5/1970 | Bocciarelli | 136/86 D |
| 3,331,706 | 7/1967 | Jenkins | 136/86 R |
| 3,522,095 | 7/1970 | Baker, Jr. et al. | 136/86 F |
| 3,575,718 | 4/1971 | Adlhart et al. | 136/86 F |
| 3,215,563 | 11/1965 | Clemm | 136/86 D |

FOREIGN PATENTS OR APPLICATIONS

| | | | |
|---|---|---|---|
| 1,109,058 | 4/1968 | Great Britain | 136/86 R |

*Primary Examiner*—Allen B. Curtis
*Attorney*—Harry Saragovitz, Edward J. Kelly, Herbert Berl and Glenn S. Ovrevik

[57] ABSTRACT

This invention pertains to an improved fuel cell of the solid electrolyte variety and a method of manufacturing same. The improved fuel cell is especially adaptable to high voltage, high power applications in that a large number of planar cell assemblies may be stacked in a compact manner to afford a relatively high power density.

1 Claim, 9 Drawing Figures

PATENTED FEB 20 1973

INVENTOR

Ralph E. Hopkins

BY Harry M. Saragovitz
Edward J. Kelly
Herbert Berl
Glenn S. Ovrevik

INVENTOR
Ralph E. Hopkins

BY
Harry M. Saragovitz
Edward J. Kelly
Herbert Berl
Glenn S. Ovrevik

HIGH VOLTAGE DEPOSITED FUEL CELL

GOVERNMENT USE

The invention described herein may be manufactured and used by or for the Government of the United States of America for governmental purposes without the payment to me of any royalties thereon.

BACKGROUND OF THE INVENTION

Fuel cells utilizing a thin layer of solid electrolyte as the medium which functions to conduct mobile ions between planar electrode surfaces are well known. Such electrolyte has the recognized advantage of a low internal resistance and thus does not introduce significant ohmic losses with consequent internal heating problems. However, the open circuit voltage of fuel cells utilizing solid electrolyte is relatively low, in the order of 1.1 volts, and a number of such fuel cells must be electrically connected in series to provide a higher voltage output. While this problem of serial electrical connection has been solved in the case of large area liquid electrolyte devices, by stacking low voltage modules, the fragile nature of large area, relatively thin, solid electrolyte fuel cells has generally precluded use of the stacked module design for voltages over 30 volts.

The only known technique for compact serial connection of solid electrolyte fuel cell devices is described in U.S. Pat. No. 3,525,646 which was issued Aug. 25, 1970. In this technique for serial connection, the fragile solid electrolyte sections are placed upon a relatively thick support surface and the entire surface, with a plurality of discrete fuel cell elements attached, is disposed in a parallel duct assembly with the support surface forming the center dividing wall of the duct assembly. The discrete fuel cell elements are serially connected anode to cathode by a relatively complex concentric conductive ring structure. It will be appreciated that the bulky structure described above is difficult to manufacture and inherently is not adaptable to a compact stacked assembly.

SUMMARY OF THE INVENTION

The fuel cell device provided by this invention consists of a battery of finite fuel cell elements electrically connected in a series-parallel arrangement which affords a high voltage, high current, low internal impedance output. In accordance with the invention, a plurality of finite fuel cell elements may be juxta disposed in a common plane and a group of similar common plane structures may be stacked with appropriate physical separation between common planes defining gas passageways. Each of the common plane structures is impervious to commonly utilized gases, such as oxygen and hydrogen, yet affords significant ion mobility in the solid electrolyte medium. It is recognized by those skilled in the solid electrolyte fuel cell art that the critical behavior of dissimilar materials, at high temperatures or abrupt changes in temperature, especially creates a gas tight, high strength junction problem. In the present invention, this problem is minimized by a substantial reduction in size of individual fuel cell elements.

Reduction in size of individual fuel cell elements and the particular configuration thereof in the present invention enables a reduction in thickness of the solid electrolyte compatible with rigidity and mechanical strength requirements and consequent improvement in internal resistance characteristics of each individual fuel cell element. Assembly of a greater multitude of fuel cell elements in parallel electrical connection further improves the overall internal resistance characteristic of the fuel cell unit with consequent lower ohmic losses. Lower ohmic losses means less internal heat is generated, of course, and this in turn improves the operating temperature characteristic and enables better temperature control over extended periods of use.

Moreover, it has been found that the present invention may be manufactured in a fast, expedient manner utilizing straightforward manufacturing techniques of proven reliability in a prescribed order. The manufacturing method of this invention is relatively inexpensive to perform, provides a planar assembly which may be stacked in spaced relation, by use of similar planar assemblies, and affords production of low cost, high voltage, fuel cell units.

A more complete understanding of the device of this invention will be had upon a review of the detailed specification and the drawings wherein.

DESCRIPTION OF THE PREFERRED EMBODIMENT

Figure 1:
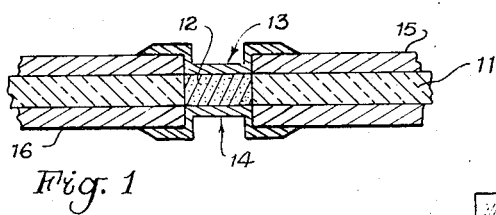
FIG. 1 is a cross section view of a single finite fuel cell element in accordance with the invention.

The single finite fuel cell element shown for illustrative purposes in FIG. 1 comprises a thin substrate 11 which is an electrical insulator of glass, ceramic or other similar material. For reasons which will become apparent hereinafter, the thickness of the substrate should be substantially uniform throughout its surface area with a minimum thickness compatible with mechanical strength requirements of the fuel cell planar structure. In a typical case, a ceramic substrate of 1mm thickness might be employed.

As shown in FIG. 1, the substrate is perforated and the perforation is filled with a solid electrolyte material 12 which serves as the medium which functions to conduct mobile ions between its surfaces. A typical mobile ion medium in this invention might be phosphoric acid in Teflon. It will be appreciated that the solid electrolyte 12 must completely fill the perforation in the substrate 11 and that the solid electrolyte material must be impervious to gas such as hydrogen and oxygen as the perforated substrate serves as a physical barrier dividing the fuel cell into separate fuel and oxident chambers.

An electrocatalyst material, indicated at 13 and 14, having a larger surface area than the cross sectional area of the solid electrolyte 12 covers the two end face surfaces thereof and overlaps the substrate 11 about the periphery of the perforation. It will be recognized that platinum or, for example, any Group VIII series metal of the periodic table may be employed as the electrocatalyst material in this invention. In the case of platinum, the electrocatalyst coating might be 50 angstroms. It will be appreciated that this minimal precious metal requirement represents a substantial cost savings in solid electrolyte fuel cell design.

In accordance with the invention, both sides of the entire substrate are substantially covered by a conductive coating indicated at 15 and 16, except for the perforated regions thereof where the center portion of the electrocatalyst material indicated at 13 and 14 covering the end faces of the electrolyte 12 is not coated and thus is exposed for reaction with its appropriate fuel or oxidant gas.

It will be recognized that the thickness of the conductive coating which may be silver, for example, is not critical provided, of course, it meets electrical current carrying requirements of the surface. In a typical instance, the thickness of a silver conductive coating might be 50,000 angstroms.

Figure 2:
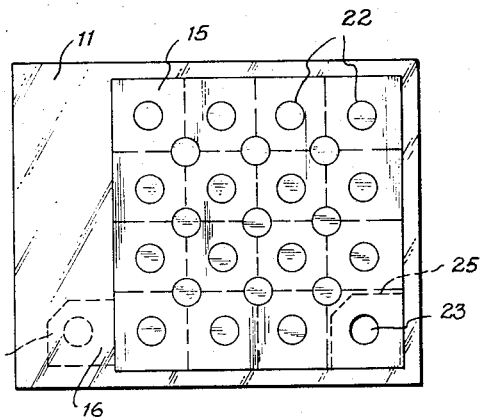
FIG. 2 shows a top view of a typical fuel cell element grouping in a common plane embodiment of the invention.

FIG. 2 shows a top view of a parallel connected grouping of 24 fuel cell elements, indicated at 22, on a substrate 11 with one electrolyte free perforation indicated at 23. For reasons which will become apparent, the upper conductive surface 15 covers each of the 25 perforations whereas the lower conductive surface 16 includes a tab section, indicated at 24, and is cutaway, as indicated by the dotted line at 25, in the vicinity of the electrolyte free perforation 23.

It will be appreciated that 25 perforations have been shown for illustration purposes only that any number of perforations per grouping may be utilized in the parallel connection of fuel cell elements. Likewise, the rectangular configuration of the grouping is not critical and may be modified as desired. For example, a square configuration with 11 perforations per side (instead of 4 per side as shown in FIG. 2) containing a total of 222 perforations including 221 fuel cell elements and one unfilled perforation has been utilized to advantage in a series connection of parallel grouping on a single substrate as hereinafter described.

Figure 3:
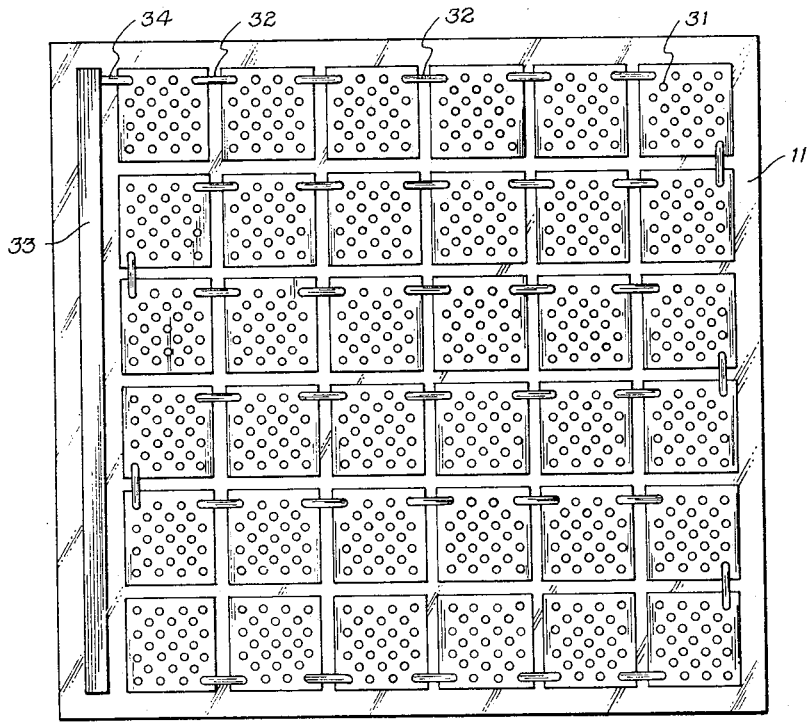
FIG. 3 depicts a typical planar structure incorporating a battery of fuel cell element groupings as taught herein.

A bettery of fuel cell element groupings 31 may be produced on a single substrate surface 11 as indicated in the top view presentation of FIG. 3. In this embodiment, each of the fuel cell element groupings may be substantially as shown in FIG. 2 with a cutaway section, not shown in FIG. 3, in the lower conductive coating in the vicinity of at least one electrolyte free perforation and a lower conductive coating tab section.

In accordance with this invention, each of the fuel cell element groupings is connected in series with at least one adjacent fuel cell element grouping. That is, the upper conductive coating of each grouping is electrically connected through the electrolyte free perforation to the lower conductive coating of one adjacent fuel cell element grouping. This electrical connection may be a simple wire connection, as indicated at 32, or in a preferred embodiment, utilizing the lower conductive surface 16 configuration shown in FIG. 2 may be accomplished by filling the electrolyte free perforation with a current conductive material such as silver. In the preferred embodiment, each of the end groupings in the series connection thereof is electrically connected to a conductive strip in close proximity to one edge of the substrate 11. For example, the upper conductive surface of one end grouping is electrically connected to conductive strip 33, as shown at 34, and the lower conductive surface of the other end grouping is electrically connected in like manner to a similar conductive strip now shown in FIG. 3 on the opposite side of the substrate 11. It will be appreciated that the electrical connection of the end groupings to respective conductive strips may be a simple wire connection as shown in FIG. 3 or in a preferred embodiment may be accomplished by a plated conductive strip and a plated electrical connection. While it is not essential to the invention that the conductive strips on each side of the substrate 11 be in close proximity to the same edge of the substrate, it will be recognized that such disposition facilitates stacking of like units in the manner shown in FIG. 5 with simplified electrical interconnection of stacked units.

Figure 4:
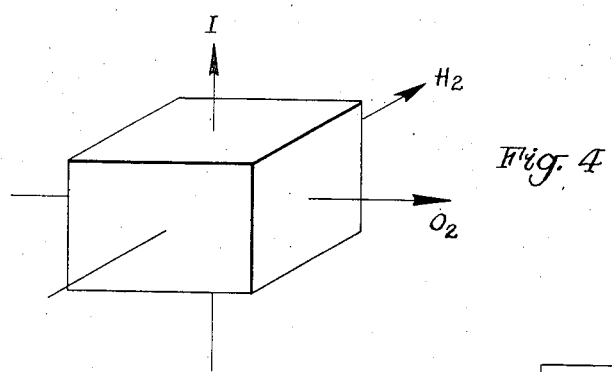
FIG. 4 is a schematic showing of a high voltage, high power, fuel cell in accordance with a stacked assembly embodiment of the invention.
Figure 5:
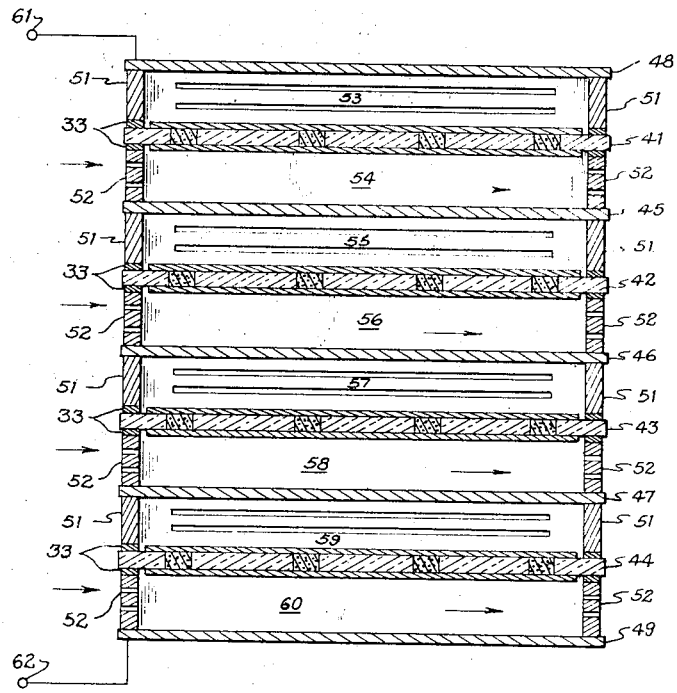
FIG. 5 is a cross section showing of one stacked assembly embodiment.

FIG. 4 shows in schematic forms a relatively high voltage embodiment of the device of this invention wherein a plurality of the substrate assemblages shown in FIG. 3 are stacked in a substantially parallel spaced arrangement with the upper and lower surfaces of each substrate assemblage supplied with respective fuel gas and oxidant gas flowing in the direction shown. As indicated in FIG. 5, one side surface may be supplied with a fuel gas such as hydrogen and another side surface may be supplied with an oxidant gas such as oxygen such that the hydrogen and oxygen gases flow in directions orthogonal to each other and to the direction of current flow in the high voltage embodiment, which is indicated by the arrow marked I. It will be appreciated that the orthogonal gas flow arrangement permits a relatively simple, compact, low cost manifold plendum design.

FIG. 5 is a cross section showing of a series connected stacked assemblage in accordance with the schematic showing of FIG. 4 depicting four planar batteries of fuel cell groupings each on its own substrate with both surfaces of each battery individually subjected to its respective fuel or oxidant gas flow. More particularly, four substrates, indicated at 41, 42, 43 and 44, are shown with three gas impervious metallic separators, indicated at 45, 46 and 47, intersperced the substrate and with two gas impervious end plates, indicated at 48 and 49. Each of the substrates 41 through 44 are separated from respective end plate separators by metallic spacer members, indicated at 51 and 52. To accomodate the orthogonal direction of gas flow, the spacer members 51 may be hollowed or slotted, as shown, and the spacer member 52 may be solid, as shown, to form eight gas flow chambers, indicated at 53 through 60. In this embodiment, the metallic spacer members 51 and 52 are disposed in allignment and electrical contact with the edge disposed conductive strip on respective sides of each substrate. Thus, the output of the stacked assemblage may be taken across the terminals 61 and 62 with the voltage determined by the product of (the number of groupings per substrate) times (the number of substrates) times (1.1 volts) and the current determined by the current capacity of each element grouping. It will be appreciated that this embodiment provides a relatively high voltage output but that the power density of the assemblage is controlled by the current capacity of each grouping of fuel cell elements.

Figure 6:
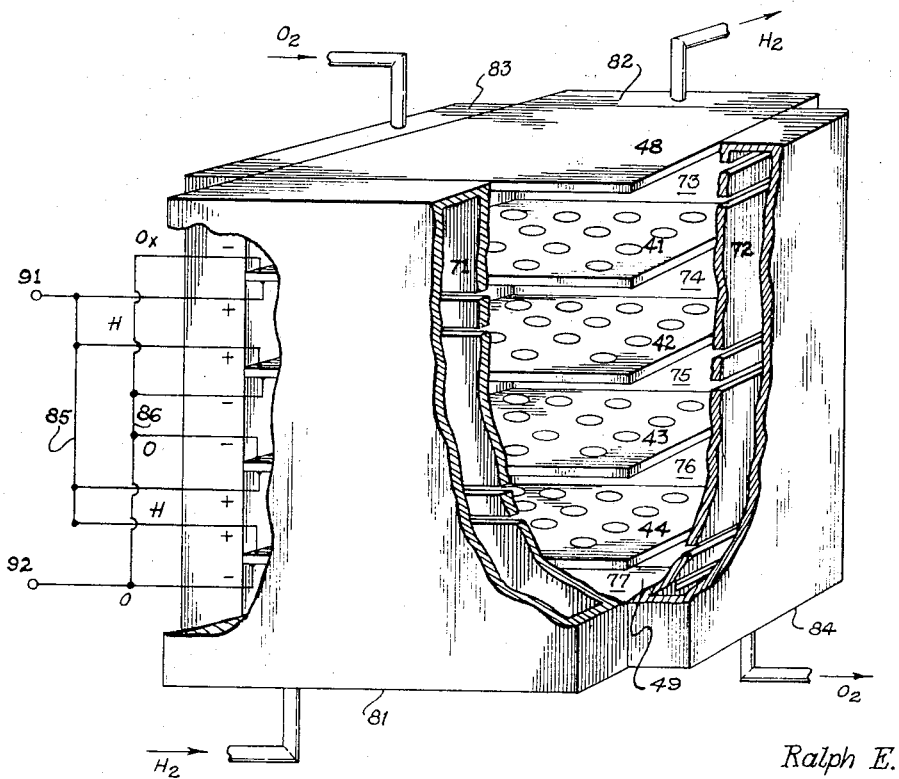
FIG. 6 is a cutaway perspective showing of a high voltage, high power, fuel cell in accordance with a preferred stacked assembly embodiment of the invention.

FIG. 6 is a cutaway perspective showing of a preferred, more compact, stacked assemblage in accordance with the invention wherein the separators shown in the embodiment of FIG. 5 are omitted, the number of gas flow chambers is reduced and consequently the height of the stacked assemblage is reduced. More particularly, four substrates exemplarily indicated at 41, 42, 43 and 44 are shown with two gas impervious end plates 48 and 49. In this embodiment however, the spacers indicated at 71 and 72 are of an electrical insulator material. As in the embodiment of FIG. 5, to accomodate the orthogonal direction of gas flow, the spacer members 71 may be hollowed or slotted, as shown, and the spacer members 72 may be solid, as shown, thus forming five gas flow chambers 73, 74, 75, 76 and 77. Manifold and associated plenum chambers 81 and 82 attached to hydrogen gas supply means, not shown, service the gas flow chambers 74 and 76. Likewise, manifold and associated plenum chambers 83 and 84 attached to oxygen gas supply means, not shown, service the gas flow chambers 73, 75 and 77.

In accordance with a preferred embodiment of the invention, the stacked assemblage of FIG. 6 is electrically connected in parallel by conductors 85 and the output of the stacked assemblage may be taken across the terminals 91 and 92. It will be seen that the output voltage of the embodiment of FIG. 6 is determined by the product of (the number of groupings per substrate) times (1.1 volts). The current capacity, on the other hand, is determined by the product of (the current capacity of each grouping of fuel cell elements) times (the number of substrates). Thus, the embodiment of FIG. 6 affords a relatively high density, high voltage power source.

Moreover, it will be recognized that each of the substrate members has substantially the same physical configuration and may be manufactured utilizing mass production techniques with consequent cost and quality assurance advantages.

It will be appreciated that the basic planar structure of the fuel cell of this invention, shown in FIG. 3, may be manufactured in large quantitues at relatively low cost by the method to be described herein. For purposes of explanation, the method of manufacture is directed to fuel cell element groupings such as shown in FIGS. 2 and 3.

In accordance with the method of manufacture, as a first step, a rectangular thin glass or ceramic substrate is perforated during the course of manufacture of the substrate by precise placement of a plurality of fine rods laid out in a specified grouping pattern and the rod material, which extends through the substrate, is subsequently removed by dissolving, melting, mechanical drilling or otherwise as appropriate. Alternatively, the first step of perforation of the substrate may be accomplished after manufacture of the substrate by conventional diamond dust fine hole drilling techniques. Obviously, the alternate method of perforation is more time consuming and expensive than the first described method and therefore, the first described method of obtaining perforations is preferred in mass production efforts.

Figure 7A:
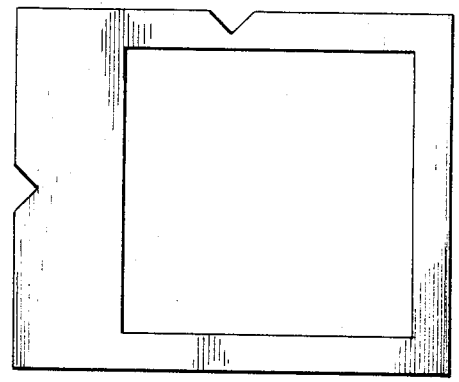
FIGS. 7, 7b and 7c depict typical masking items for use in the manufacture of the preferred embodiment of this invention.
Figure 7C:
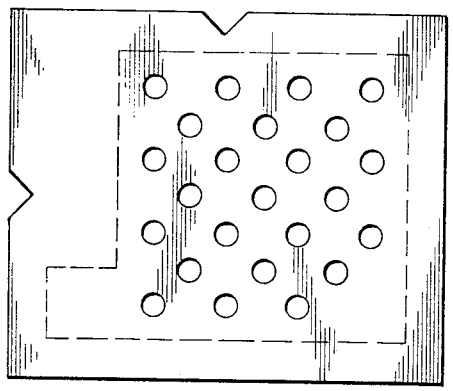
Figure 7B:
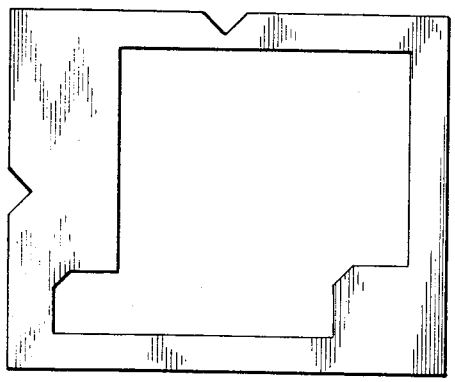

As a second step, the two sides of the substrate are coated with a relatively thick film (50,000 A) of electrically conductive materials such as silver or gold utilizing the masks shown in FIGS. 7a, and 7b for each grouping. In a typical case, the conductive material might be deposited in a conventional sputtering fixture. As the perforation in the substrate will be filled with electrolyte in a subsequent step, the conductive coating of step 2 must not close these perforations. It has been found that by use of the sputtering technique, the finite perforations will remain open.

As the conductive material pattern of each element grouping does not differ essentially on each respective surface of the substrate, the mask shown in FIG. 7a would be used to provide the conductive coating on one surface of the substrate and the mask shown in FIG. 7b would be used to provide the conductive coating on the opposite surface of the substrate.

As a third step, the perforated and coated substrate is filled with an immobilized (solid) electrolyte such as phosphoric acid in teflon. This step may be accomplished by forcing a finely ground teflon powder into the perforations by conventional rolling or plate and press pressure techniques which serve to compact the teflon powder into a bonded state and subsequently soaking the filled substrate in a bath of phosphoric acid for a period of time sufficient to impregnate the bonded taflon powder. It will be recognized that the mobile ion medium, in this example, phosphoric acid impregnated teflon powder, may be constituted prior to filling the perforation in the substrate, if desired. However, it has been found that unadulterated taflon powder is readily worked into the perforations and compacted therein and that subsequent treatment of the teflon powder is preferred. As the next step necessitates relatively smooth substrate surfaces, the filled substrate is cleaned and leveled by mechanical scraping, or otherwise, in preparation therefor.

The fourth step involves sputtering a catalyst material, such as platinum over both exposed surfaces of the electrolyte using the catalyst mask shown in FIG. 7c. As the diameter of the holes in the mask is slightly larger than the diameter of the perforations, the catalyst material serves to seal the mobile ion medium, the solid electrolyte within the coated substrate.

Next, as a fifth step, one corner disposes filled perforation of each grouping is drilled or punched to remove the solid electrolyte contained therein. As this electrolyte free perforation is to be used as an electrical interconnection between surfaces, a tinned wire may be threaded through the electrolyte free perforation if desired. However, as a practical matter, it has been found that by sufficient enlargement of the perforation, the threaded wire may be eliminated.

It will be recognized, especially in consideration of the finite size of the fuel cell elements, that precise placement of the masks is essential to the manufacture of the planar structure and that the register notches shown on two edges of each of the masks enable such precise placement. Moreover, it will be appreciated that in actual manufacture of the planar structure all element groupings on a single substrate would be manufactured simultaneously utilizing a complex multi-grouping mask, not shown, at each coating stage of the manufacturing process.

The method of making terminal connections on each surface of the planar structure is not critical and any printed circuit technique, or the like, may be employed to enable serial interconnection of planar structures in accordance with the embodiments of FIGS. 5 or 6. For example, a lead wire may be soldered to the appropriate grouping conductive coating on each surface for external interconnection as prescribed herein.

In making the high voltage fuel cell embodiment of FIG. 6, the planar structures are stacked in spaced relation and the end plate and gas plenums attached to the stacked assembly in a conventional manner as dictated by straightforward mechanical considerations.

Following the teaching of this disclosure, a fuel cell stacked assembly having a 62.2 ampere, 157.5 volt, 10,000 watt rating may be built in a relatively small cube unit approximately 13 inch by 13 inch per side. In such a stacked assembly, 222 planar structures would be incorporated with 121 element groupings in each planar structure and with 221 fuel cell elements per grouping. In such a planar structure each fuel cell element would be contained in a 1.0 mm diameter perforation with a 0.32111 mm spacing between perforations with each fuel cell element having an effective cell area of 0.78540 sq. mm. In accordance with calculations, each fuel cell element would have an internal impedance of 19.48 ohms, and would generate 0.000888 watts with a heat energy loss of 0.000031 watts.

While the fuel cell assembly of this invention and especially the planar structure thereof have been described with particular reference to specific embodiments, it is understood that this invention is not restricted to the exemplarily shown embodiments. Likewise, the method of manufacture of the planar structure may be other than as specifically set forth without departing from the general purview of the disclosure.

I claim:
1. A high voltage energy power source of the solid electrolyte fuel cell variety comprising:

a stack of similar planar fuel cell units disposed in substantially parallel spaced co-adjacent relation and gas flow distribution means adapted to direct a fuel gas of the hydrogen variety across one planar face of each fuel cell unit and an oxidant gas of the oxygen variety across the other planar face of each fuel cell unit;

each fuel cell unit including a thin substrate of electrical insulating material containing a multitude of finite fuel cell elements, each of said fuel cell elements including a solid mobile ion medium which extends through said thin substrate, a like plurality of conductive coatings on each surface of said thin substrate with said fuel cell elements in parallel electrical connection, said conductive coatings on each surface having a selected cutaway configuration with a tab extension of selected configuration on at least one surface of said thin substrate such that said tab extensions extend into respective cutaway sections of adjacent groupings and each of said tab sections is spaced from the edges of its respective cutaway area, an electrocatalyst material coating on each surface of said thin substrate selectively disposed to individually enclose each solid mobile ion medium within said thin substrate, and means for electrically connecting each one of said groupings to an adjacent grouping in a series circuit arrangement, wherein an electrical connection is made through said thin substrate to a respective tab extension and each connection comprises an electrical conductor extending from said tab section to the conductive coating on the other surface of said thin substrate opposite the grouping containing that tab sections respective cutaway area;

means for electrically connecting said series circuit arrangement of groupings of each of said fuel cell units of said stack thereof in a series circuit;

and output terminal means connected to end conductive coatings of the last said series circuit.

* * * * *